Apr. 24, 1923.
F. H. CARSSOW
OPTICAL INSTRUMENT
Filed March 20, 1919
1,452,675
9 Sheets-Sheet 1
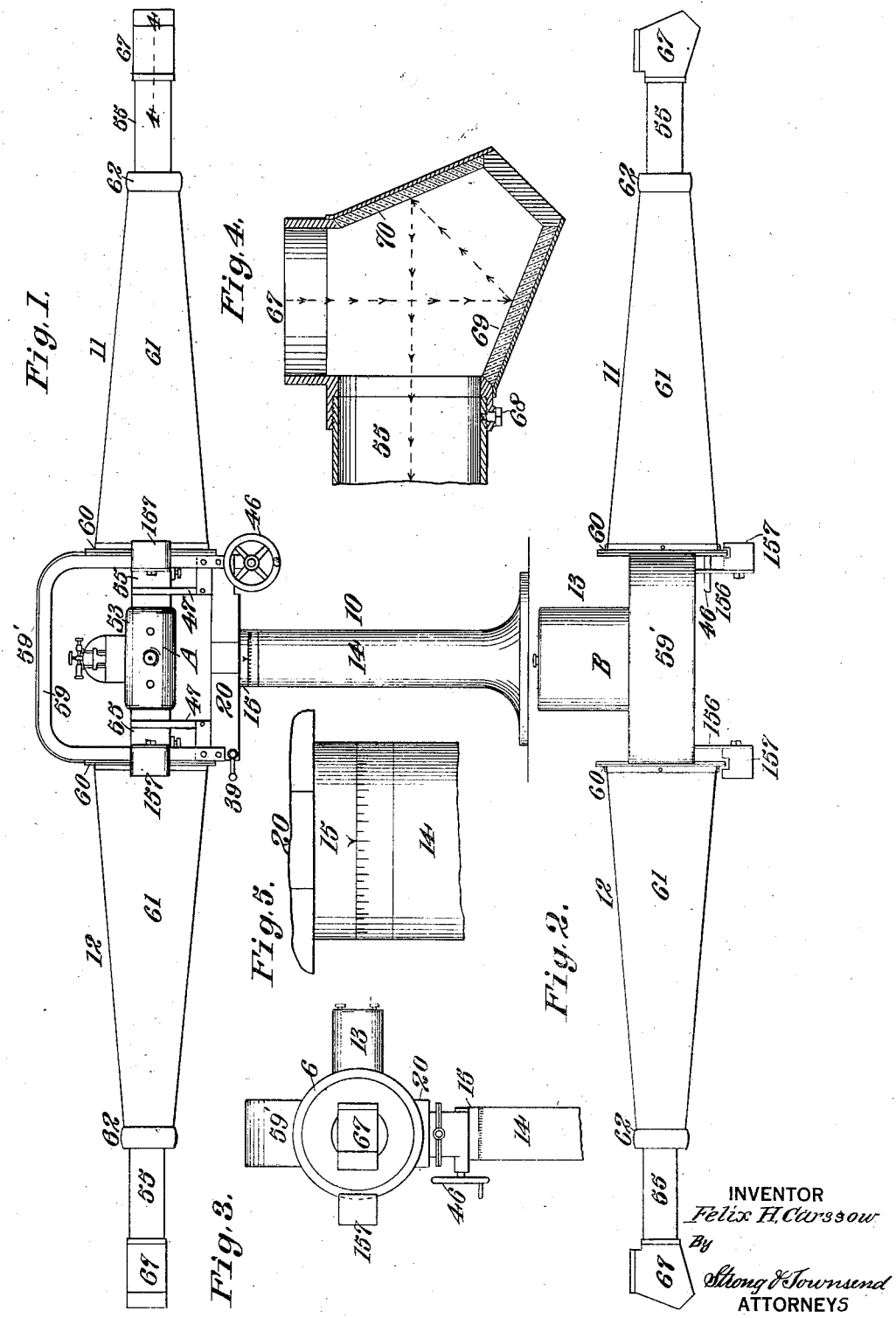
INVENTOR
Felix H. Carssow
By
Strong & Townsend
ATTORNEYS Apr. 24, 1923. 1,452,675
F. H. CARSSOW
OPTICAL INSTRUMENT
Filed March 20, 1919 9 Sheets-Sheet 2
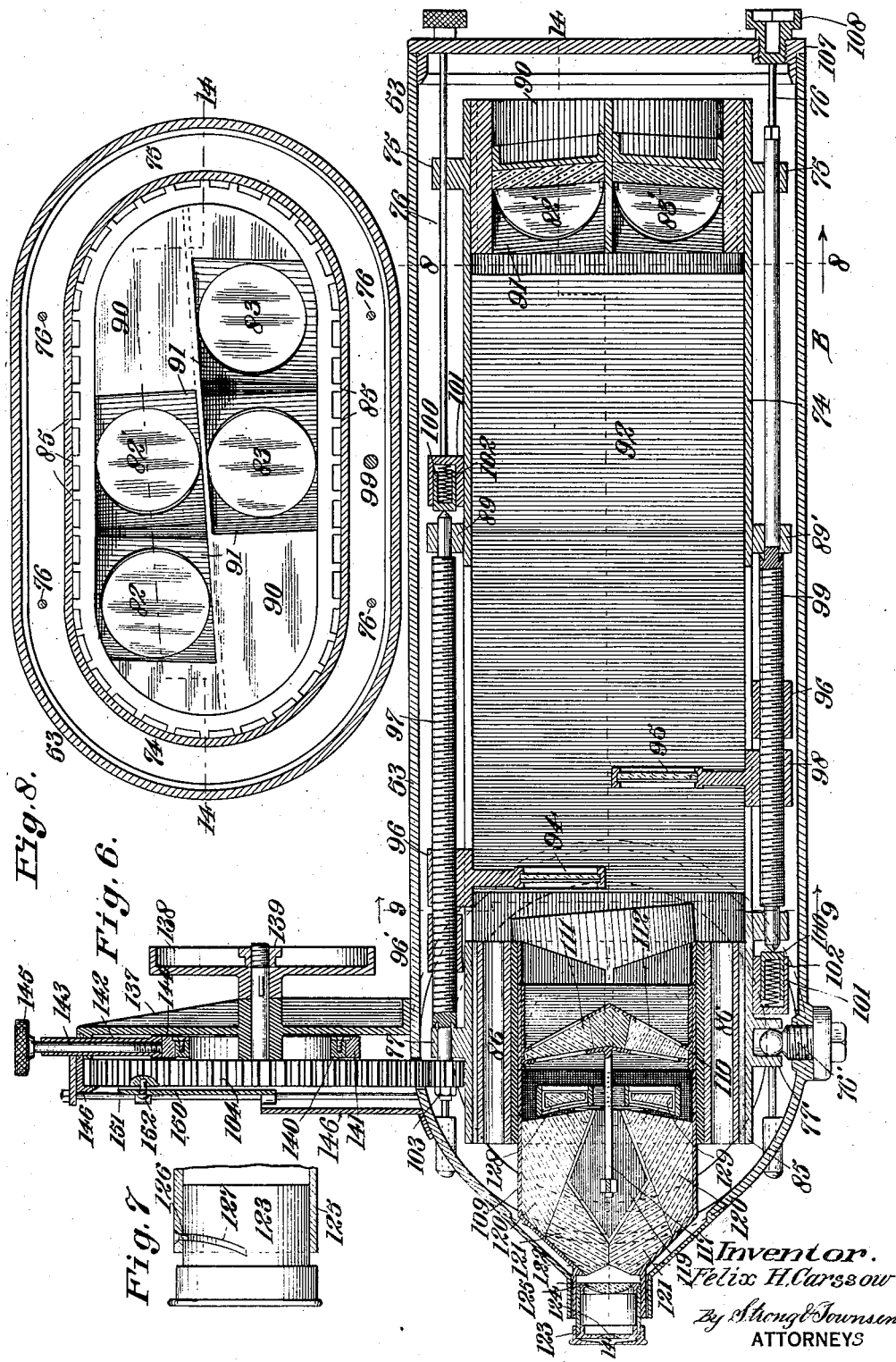
Inventor.
Felix H. Carssow
By Strong & Townsend
ATTORNEYS Apr. 24, 1923.
F. H. CARSSOW
OPTICAL INSTRUMENT
Filed March 20, 1919
1,452,675
9 Sheets-Sheet 3
Fig. 9.
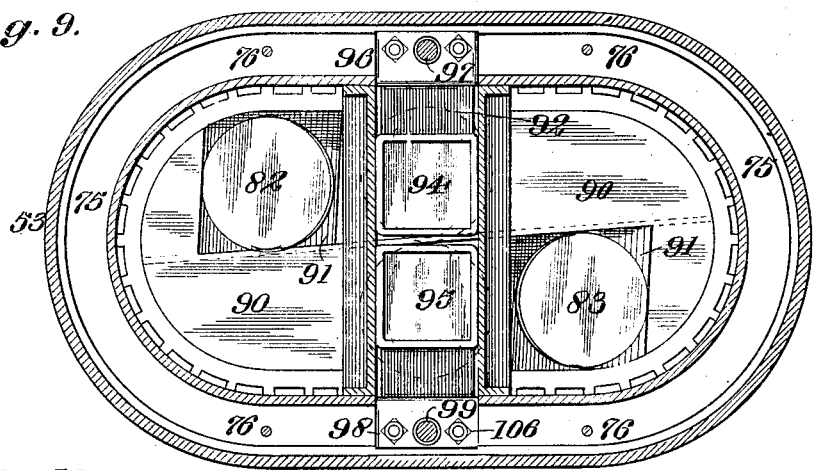
Fig. 10.
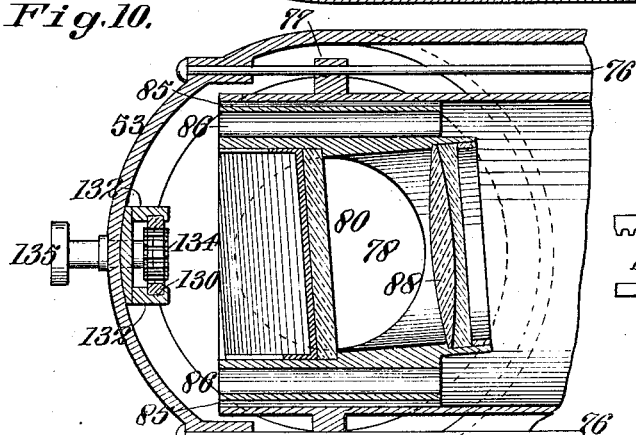
Fig. 11
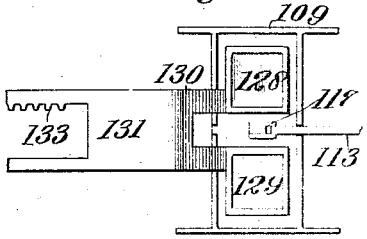
Fig. 12.
Fig. 13.
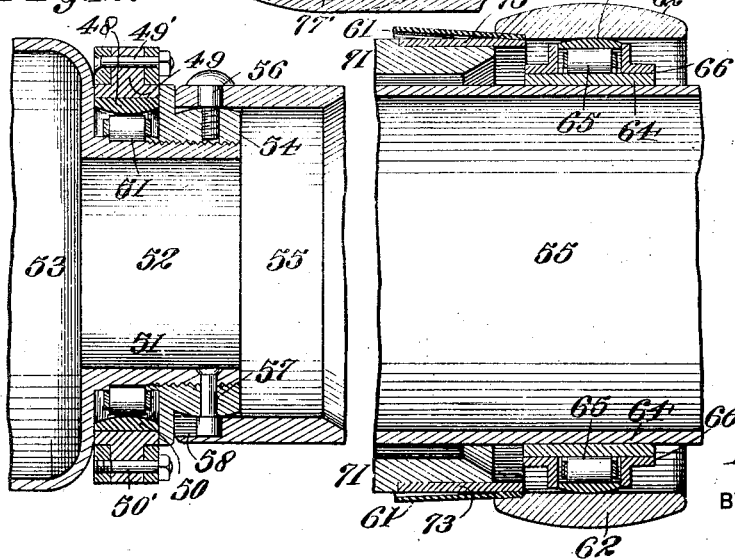
INVENTOR
Felix H. Carssow
BY
Strong & Townsend
ATTORNEYS Apr. 24, 1923.  
F. H. CARSSOW  
OPTICAL INSTRUMENT  
Filed March 20, 1919    9 Sheets-Sheet 4
1,452,675
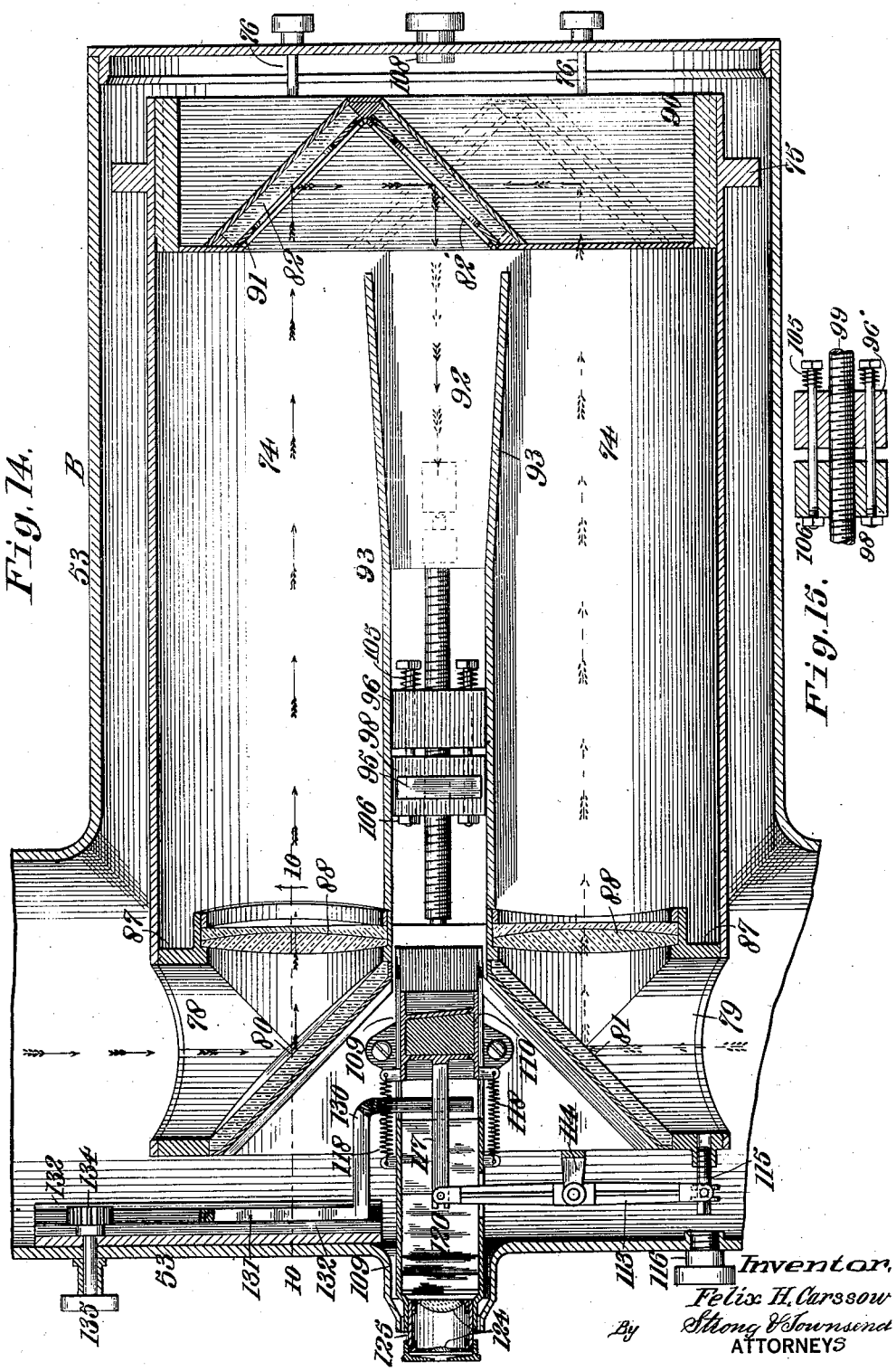

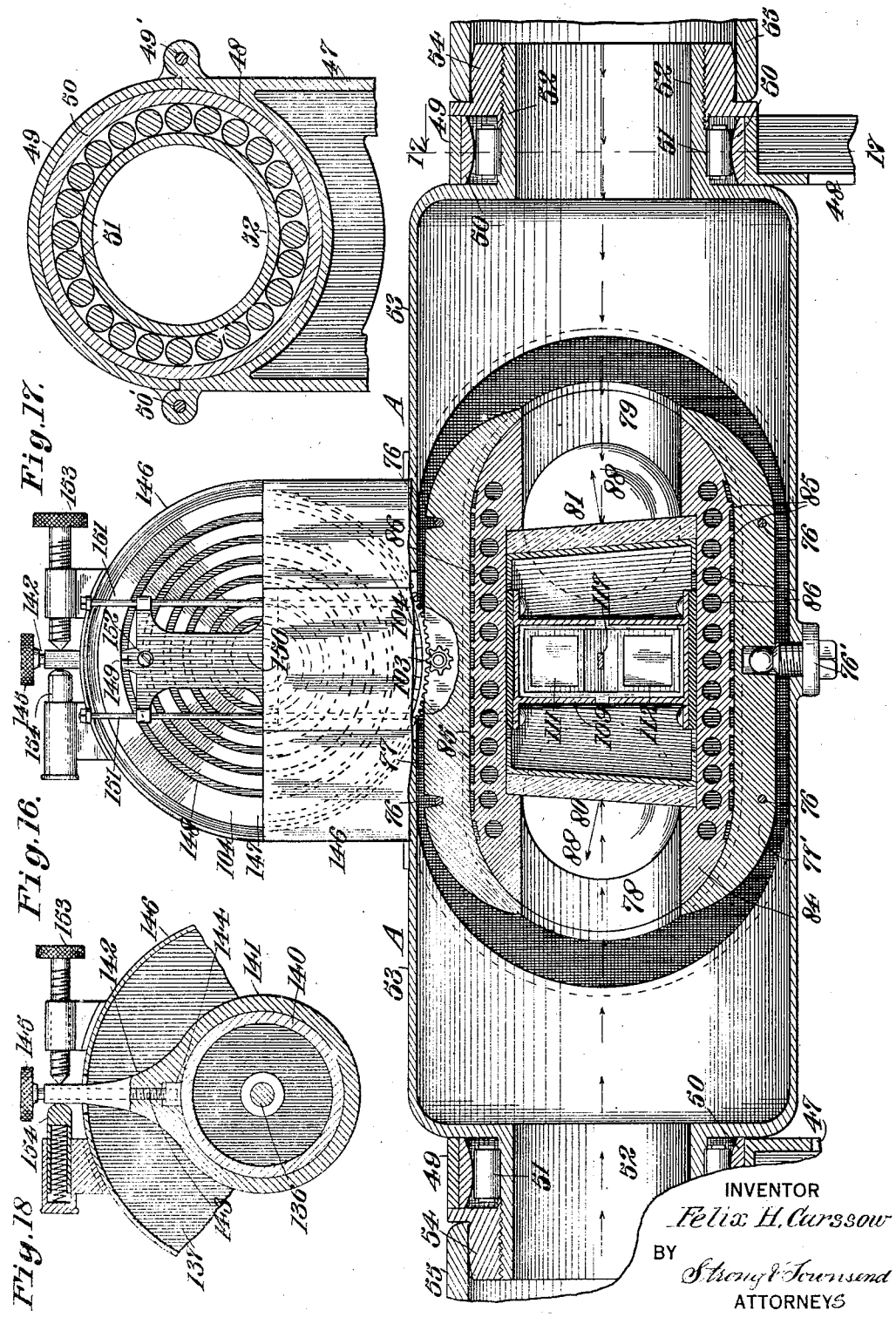

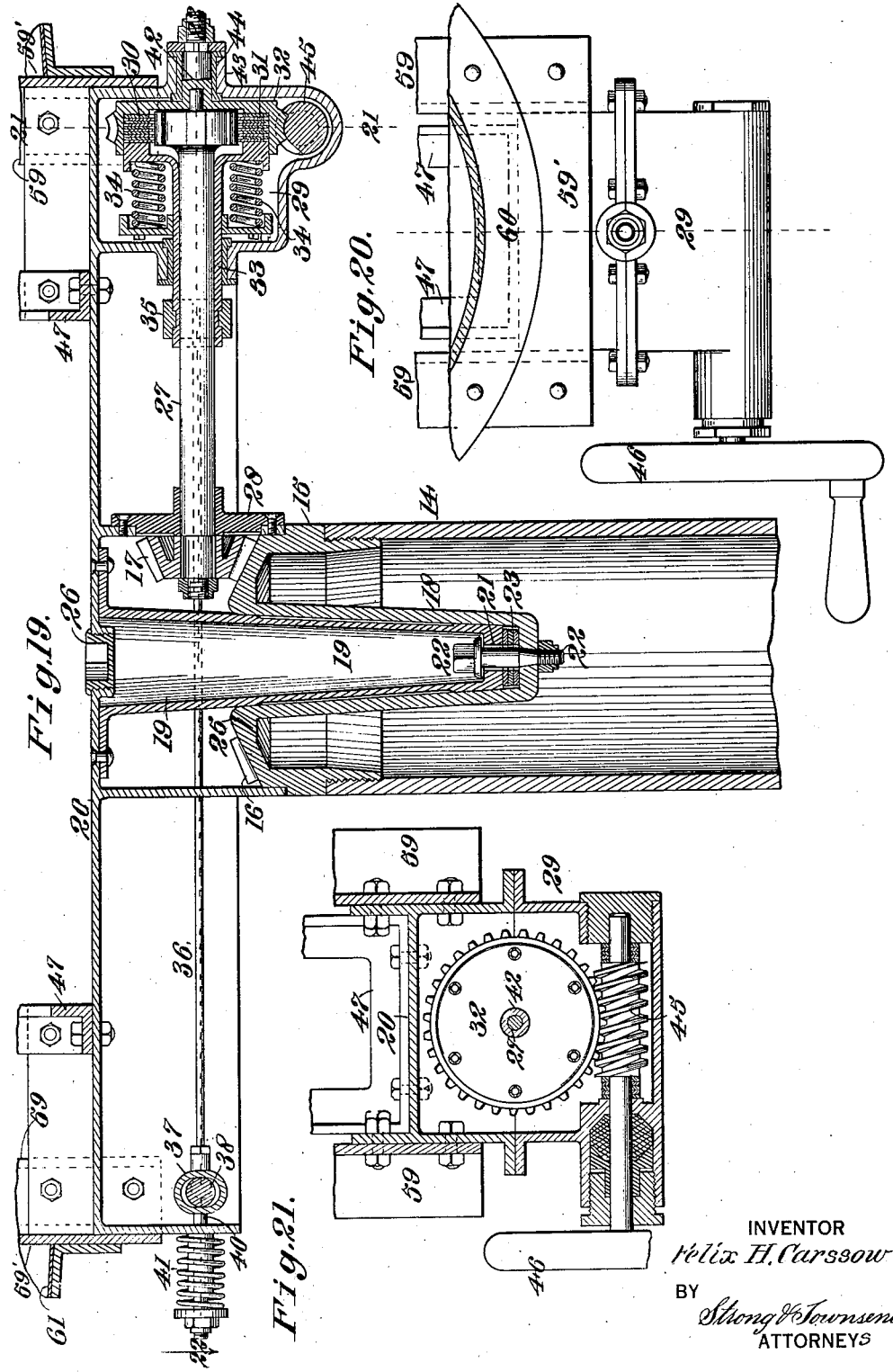

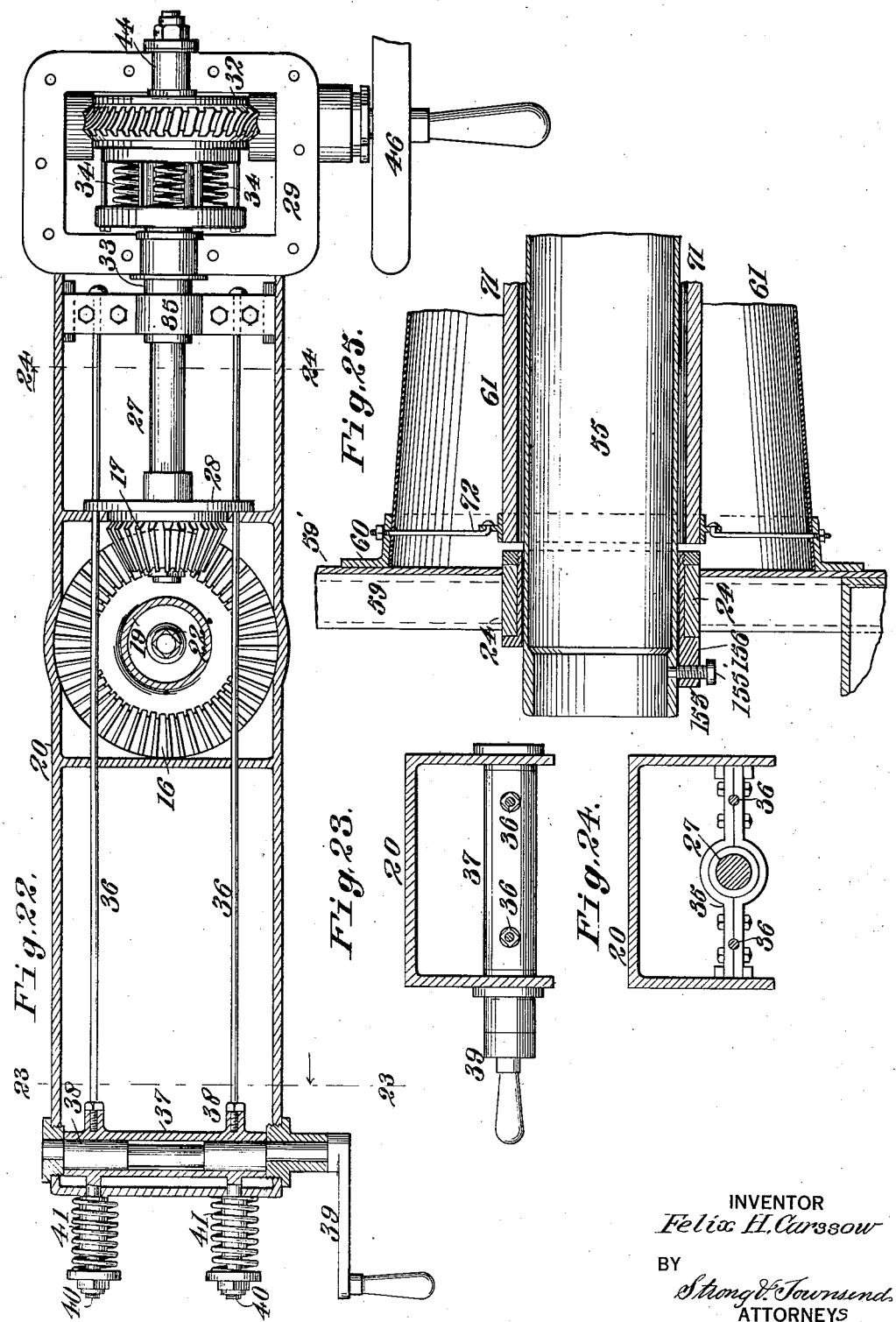

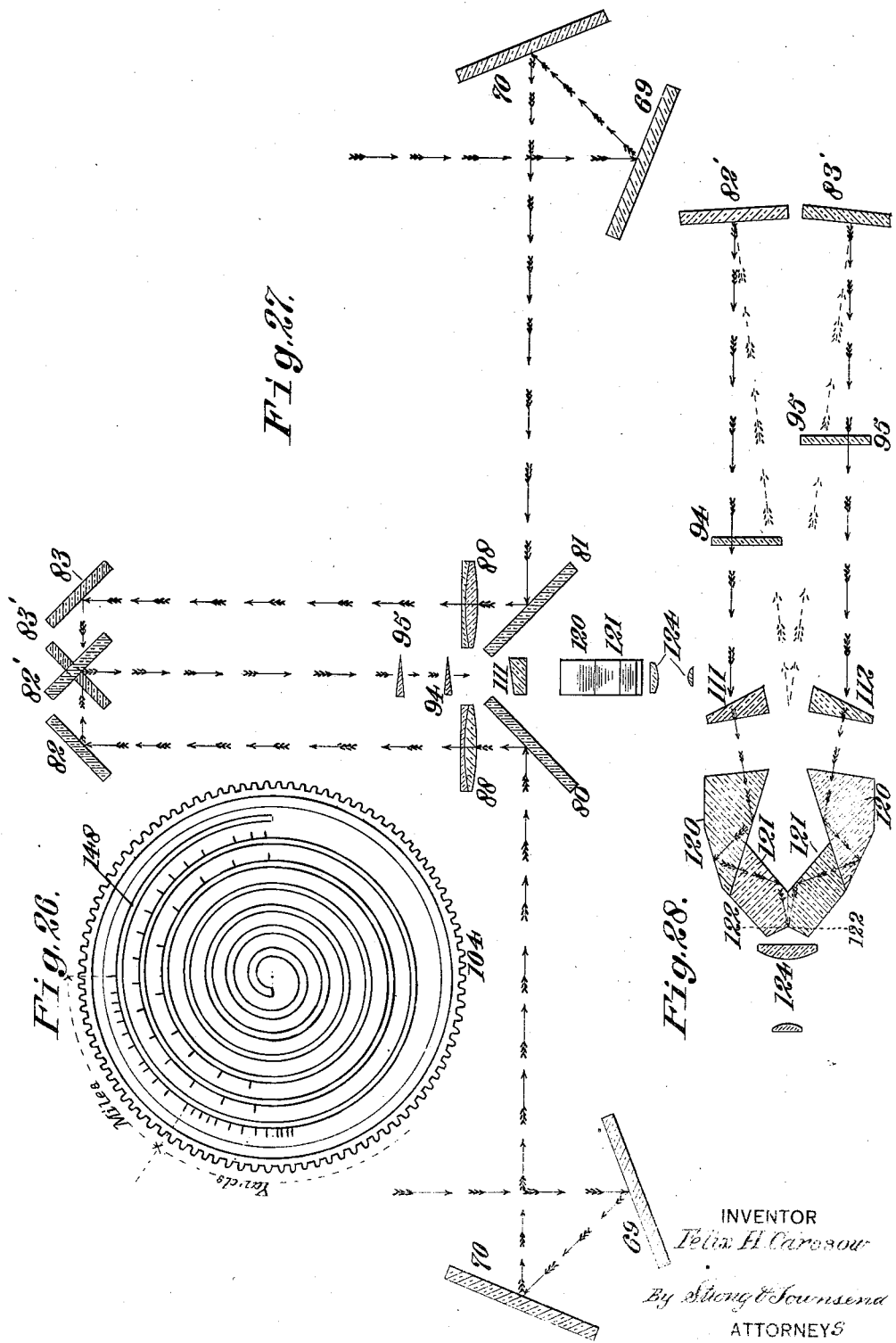

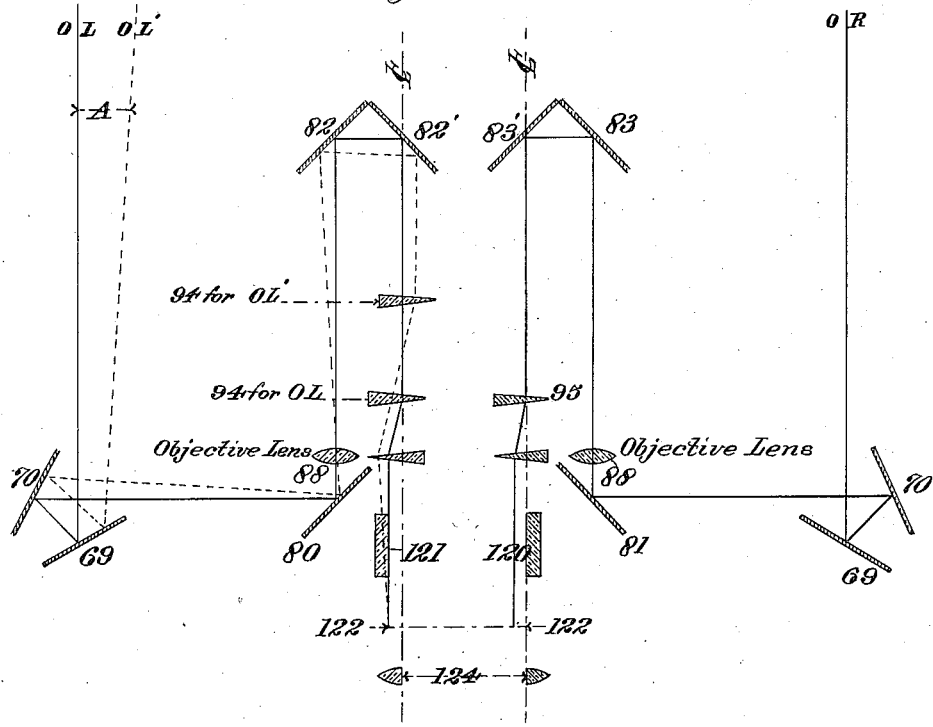
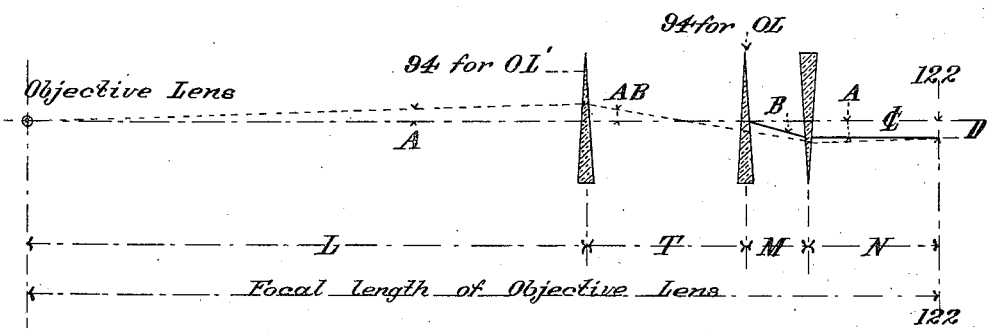

Patented Apr. 24, 1923.

1,452,675

UNITED STATES PATENT OFFICE.

FELIX H. CARSSOW, OF VALLEJO, CALIFORNIA.

OPTICAL INSTRUMENT.

Application filed March 20, 1919. Serial No. 283,719.

*To all whom it may concern:*

Be it known that I, FELIX H. CARSSOW, a citizen of the United States, residing at Vallejo, in the county of Solano and State of California, have invented new and useful Improvements in Optical Instruments, of which the following is a specification.

This invention relates to a geometrical instrument, and particularly pertains to range and position finders of that type commonly known as self-contained base and coincident instruments.

The objects of my improvements are: first, to provide an instrument that may be readily taken apart, transported and reassembled, without affecting the adjustment of the several parts, nor of the reassembled instrument as a whole; second, to provide an instrument in which the vital parts have been collected into three main groups so that the intervening parts may suffer injury without interfering with the successful operations of the whole; the central group being brought within a space so small as to be readily protected; and, third, to provide an instrument in which the telescopic objectives and ocular are so disposed with regard to each other that the adjustment of the instrument and its accuracy will suffer least from distortions and displacements due to temperature changes, shocks and vibrations.

The present invention contemplates the use of a fixed support, a central optical unit, complementary light passage tubes detachably secured at the opposite sides of said unit, each tube carrying at its outer end an optical square through which observations may be made.

The invention is illustrated by way of example in the accompanying drawings, in which Figure 1 is a view in elevation, disclosing the completely assembled instrument.

Fig. 2 is a view in plan disclosing the instrument shown in Fig. 1.

Fig. 3 is a view in end elevation, illustrating the general design of the upper portion of the instrument and a fragmentary part of its pedestal.

Fig. 4 is an enlarged fragmentary view in horizontal section illustrating one of the optical squares and the reflectors embodied therein.

Fig. 5 is an enlarged fragmentary view illustrating a portion of the cross frame and pedestal, with the graduations for measuring azimuth angles thereupon.

Fig. 6 is an enlarged view of central longitudinal section through the body of the instrument, disclosing the position of the eye piece, the various prisms and reflectors and the means whereby the range is measured and indicated.

Fig. 7 is an enlarged fragmentary view illustrating the adjustment of the eye piece.

Fig. 8 is a view in vertical section and elevation, as seen on the line 8—8 of Fig. 6, and particularly illustrates the arrangement of the 180 degree reflectors.

Fig. 9 is a view in vertical section and elevation as seen on the line 9—9 of Figure 6, disclosing the measuring and adjusting prisms as well as the 180 degree reflectors.

Fig. 10 is a view in section and elevation as seen on the line 10—10 of Fig. 14.

Fig. 11 is a view in elevation illustrating the astigmatizer lenses and mounting for the same.

Fig. 12 is a fragmentary view disclosing the manner in which the central body portion of the instrument and the inner ends of the light passage tubes are rotatably supported.

Fig. 13 is an enlarged view in section illustrating the manner in which the light passage tubes are rotatably supported near their outer ends.

Fig. 14 is an enlarged view in horizontal section along the line 14—14, Fig. 6, illustrating the most vital parts of the instrument body.

Fig. 15 is a fragmentary view disclosing the take-up nuts used with the measuring and adjusting prisms.

Fig. 16 is an enlarged view in vertical section and elevation illustrating the range dial or the distance indicating apparatus of the instrument, and further disclosing its connection to the measuring screw through the meshing of their gears.

Fig. 17 is a view in vertical section on the line 17—17 of Fig. 16.

Fig. 18 is an enlarged fragmentary view in section disclosing the clamping and slow motion device used in the accurate setting of the range dial and the measuring prism.

Fig. 19 is a view in vertical section and elevation illustrating the upper portion of the pedestal, the instrument cross frame mounted thereupon and means for locking and rotating the instrument about the axis of the pedestal.

Fig. 20 is a fragmentary view in end elevation illustrating the hand-wheel arrangement by means of which the instrument is rotated about the axis of the pedestal.

Fig. 21 is a view in vertical section as seen on the line 21—21 of Fig. 19.

Fig. 22 is a view in horizontal section as seen on the line 22—22 of Fig. 19.

Fig. 23 is a view of the eccentric yoke used in locking the instrument to the pedestal as seen on the line 23—23 of Fig. 22.

Fig. 24 is a view in transverse section illustrating the parts on the line 24—24 of Fig. 22.

Fig. 25 is an enlarged fragmentary view in section disclosing the construction of the hollow cantilever beams.

Fig. 26 is a view in elevation illustrating the range dial.

Fig. 27 is a diagrammatical view showing the horizontal arrangement and relation of the various lenses, prisms and reflectors to each other.

Fig. 28 is a view in diagram showing the vertical relation of the central lenses, prisms and reflectors to each other.

Figs. 29 and 30 are views in diagram indicating the various optical elements of the invention and their mathematical relation to each other.

The instrument is shown as if sighted on a point at infinity and lying in the horizontal plane passing through the base line, and it is considered as being in this position, and in adjustment in the description of the various parts.

The instrument is symmetrical about the transverse vertical plane passing through the pedestal axis, except as otherwise shown in this drawing, or noted in the specification.

Broadly considered, the instrument in which the present invention is concerned comprises a supporting unit 10, right and left hand side tubes, 11 and 12 with their optical squares and a central body portion 13. The pedestal is here shown as comprising a vertical tubular casing 14, internally threaded at its upper end and receiving a cap 15. This cap is formed with a cylindrical body portion adapted to rest upon the upper squared end of the pedestal 14, and fitted with a threaded flange extending thereinto. The top of the cap is provided with a beveled gear 16. This gear completely encircles the central vertical axis of the base, and is in constant mesh with the beveled pinion 17, by which the azimuth setting of the instrument is controlled.

Formed as a continuation of the head of the cap 15 and extending downwardly into the pedestal is a conical tubular socket 18, which is adapted to receive a tubular conical spindle 19. This spindle is fixed to the cross frame member 20 of the body portion of the instrument. The lower end of the spindle is closed save for the bolt opening 21, through which a bolt 22 extends. This bolt passes downwardly and is formed with a tapered shank adapted to register with a tapered opening in the end of the socket 18 and form an oil tight plug and is also intended to prevent the spindle 19 from accidentally lifting from its seat, and its superstructure.

Interposed between the inner face of the socket end and the lower face of the spindle 19 are a plurality of thrust washers 23. These washers are provided with a lubricant passing downwardly around a bolt. This lubricant is also free to pass upwardly between the spindle and the socket to afterwards flow outwardly to the gear 16 and downwardly through a passageway 25 into the pedestal. It will be understood that the hollow cavity within the spindle 19 is supplied with any desired lubricant and is filled through the opening occupied by the screw plug 26. This opening also serves for the purpose of removing and inserting the bolt 22.

The pinion 17 is fixed to rotate with a pinion shaft 27 and is carried within a bearing plate 28 at one end and a suitable clutch housing 29 at its opposite end. This shaft extends beneath and parallel to the cross frame of the instrument body. The outer end of the shaft 27 is appropriately enlarged and provides a slidable mounting for a plurality of clutch disks 30 which are fitted thereto so as to rotate with the same. These disks are complementary to other disks 31, between which they are alternately interposed.

The disks 31 are slidably mounted in grooves so as to rotate with the worm gear 32, and may be brought into frictional engagement with the disks 30 by the pressure exerted by a clutch sleeve 33 as influenced by the expansion of helical springs 34. This pressure may be relieved by shifting the sleeve 33 by a cross-head 35. As particularly shown in Fig. 22, this cross-head is slidably mounted within the main frame 20 and is provided with two tension rods 36, which connect at their rear ends with an eccentric yoke 37. This yoke receives an eccentric 38. At the end of the eccentric shaft is fitted a crank 39, by which it may be rotated, and the yoke 37 thus shifted horizontally. Studs 40 extend from the yoke 37 through openings in the end of the cross-frame 20. These studs are fitted at their outer ends with nuts and washers, and between the washers and the frame are interposed expansion springs 41. These springs partially counterbalance the action of the springs 34, on the clutch sleeve 33, making it easier to turn the crank 39.

The worm gear 32 is formed integral with a stud shaft 42, which extends outwardly through an opening 43 in the housing 29, and is there held by a suitable washer and nut. A bearing bushing 44 is mounted within the opening 43 to relieve the friction of the stud as it rotates. A counterbore is also formed in the face of the worm gear to receive a centering stud which is a part of the shaft 27. In mesh with the worm gear 32 is a worm 45, which is appropriately housed within the structure 29 and is provided with a handwheel 46. The mounting of the worm 45 is particularly shown in Fig. 21.

When the friction disks 30 and 31 are not subjected to pressure from the clutch sleeve 33, the instrument is free to rotate about its vertical axle, and when the clutch sleeve is permitted to act, subjected to the full force of expansion springs 34, it will lock the instrument so that it cannot move in azimuth, except through turning the handwheel 46. By holding back on the clutch sleeve, pressure on the disks between zero and that necessary for locking may be introduced, and azimuth movement dampened.

Mounted upon the cross frame 20 at points near its opposite ends are standards 47. These standards are formed with a seating portion 48 and stirrup portions 49 as particularly shown in Figs. 12, 16 and 17. The stirrups are held in position with hinge bolts 49' and suitable lock bolts 50.' An outer bearing raceway 50 is mounted within each of said members 48 and 49 and is adapted to form the bearing support for a plurality of anti-friction bearings 51.

The ring 50 is preferably formed with an internally crowned face, upon which the bearings may run and which will allow distortion of the structure without causing the bearings to bind. The bearings are supported upon tubular hubs 52, which form a part of the central optical body housing 53, as shown in Fig. 16. The bearings are retained in position by means of threaded collars 54, mounted upon the hubs 52 and formed with a flange adapted to limit the endwise travel of the raceway rings 50. These flanges combine with the end faces of housing 53 to form restraining grooves for members 48 and 49. These collars 54 are also formed with a crowned surface, in this instance the crown being exterior of the collar and adapted to provide an adjustable joint for the light passage tubes 55.

The light passage tubes 55 extend outwardly from the opposite sides of the housing portion 53 and are detachably secured thereto by aligning screws 56, which extend through fitted holes in the tubes and have threaded ends passing into corresponding openings in the collars 54. Diametrically opposite the screw 56 of each tube is a pin 57, extending radially from the crowned surface of the collar 54, and registering with a longitudinal slot 58 formed in the inner wall of the tube. By this arrangement the light passage tubes may be detachably secured in position and in relation to the hubs 52 of the main housing 53. It is to be understood that the central axis of the right and left light passage tubes 55 are in horizontal longitudinal alignment with each other.

To each end of the cross frame 20 is attached a yoke consisting of two channels 59 and a reinforcing plate 59'. Circular flange angles 60 are fixed to the opposite outer faces of the yoke 59', and provide mountings for tapered hollow cantilever beams 61. These cantilever beams are generally indicated in Fig. 1, and shown in detail in Figs. 13 and 25. They partially enclose the tubes 55, at the same time providing supports for them near their outer ends. The outer end of each of the cantilever beams is fitted with a seating ring 62, within which an externally crowned outer raceway 63 moves with a running fit. The raceway circumscribes a roller band 64, fastened to the tubes, and with it forms an annular space, within which the bearing rollers 65 are disposed. Sealing collars 66 are fixed to the opposite ends of the roller band and limit the endwise travel of the rollers and the outer raceway ring 63. The bearings thus formed permit rotation of these light passage tubes with the body housing 53; at the same time permit of longitudinal sliding between the seating ring and the outer raceway.

To the end of the tubes 55, extending beyond the roller bands 64, are fitted optical squares 67. These members are formed with frame portions threaded to engage the outer ends of the tubes 55 and to be locked in position by means of aligning screws 68. The frames form openings at the opposite ends of the two sections 11 and 12, and are of the same dimensions and distance from the vertical center of the instrument.

Positioned directly in the rear of each of said openings is a reflector 69, which receives the light rays passing in through the exterior openings of the optical squares and throws these rays upon their reflectors 70, which in turn reflect the rays and cause them to travel toward the center of the instrument.

In order to facilitate the removal from and the return to their working positions of the tubes 55, cylindrical tubes 71 are provided, and through these the tubes 55 extend. The inner ends of the tubes 71 are secured to the member 60 by guy wires or spokes 72, while the outer ends of these members are rigidly connected with the rings 62 and the casing 61 by means of collars 73.

The body portion 53, within which the central optical members are housed, is T shaped, having a longitudinally extending portion "A", particularly shown in Fig. 16, and at the opposite sides of which the light passage tubes 55 are mounted. A laterally extending portion "B" is at right angles to the portion "A" for a purpose herein to be set forth. The portion "A" of the housing 53 is cylindrical and is disposed concentric to the longitudinal axis of the two tubes 55.

Mounted within the lateral portion "B" of the housing and extending across the longitudinal axis of the tubes is the central optical group case 74. The portion "B" of the housing 53 and the case 74 are flattened cylinders as clearly shown in Fig. 9. The case 74 is formed with a heat distributing rib 75 near its outer end, through which supporting rods 76 extend. These rods pass through the opposite ends of the housing and are arranged as shown in Figs. 6 and 9. Ribs 77 and 77' are formed around the opposite end of the case 74 to distribute the heat and also to receive the rods 76, as shown in Figs. 10 and 16, thus providing a support for the case. Though the rods support the central optical group contained in the case 74, still it would be free to move along the same were it not for the spherical portion of screw 76' fitting snugly into the cylindrical hole in the rib 77'. By this method of mounting, the case 74 and its contents are fixed in position relative to the eye piece, while practically free from the strains liable to occur in the outer housing 53.

Formed through the opposite vertical sides of the case 74 and concentric with the longitudinal axis of the tubes 55 are circular openings 78 and 79 respectively. These openings allow the light rays passing from the reflectors 70 to impinge directly upon the 90 degree reflectors 80 and 81. The reflector 80 is disposed in the path of travel of rays passing through the opening 78, and the reflector 81 is disposed in the path of travel of rays passing through the opening 79. The reflector 80 is slightly tilted to incline the reflected light rays upwardly, while the reflector 81 is correspondingly tilted in an opposite direction to incline its reflected light rays downwardly, thus causing the rays from the reflector 80 to strike against a reflector 82 in the top of the case 74 and at the opposite end thereof, while rays from the reflector 81 will strike a reflector 83 located at one side of and beneath the reflector 82, at the opposite end of the case.

The deflectors 80 and 81 are mounted in a removable frame 84, particularly shown in Figs. 14 and 16. This frame has an outer contour agreeing with the inner surface of the case 74, within which it fits and is attached. In order to minimize distortion of the frame and case due to heat effects, a plurality of longitudinally extending ribs 85 are formed along the frame. The frame is further fitted with a plurality of perforations 86, as shown in Fig. 16.

The front face of the frame is formed with lens seats 87 inclined at equal angles and in opposite directions from the vertical. In each set is mounted an objective lens 88, through which the light rays pass to the reflectors 82 and 82', and the reflectors 83 and 83' at the opposite end of the case.

The reflectors 82 and 82' are disposed at 90 degrees to each other, while the reflectors 83 and 83' are similarly disposed. Reflectors 82' and 83' are superimposed, and arranged to reflect their light rays in a single vertical plane parallel with the central longitudinal axis of the housing portion "B", but separated far enough vertically in order that the beams of light through the objective lenses do not overlap.

The 180 degree reflectors 82, 82', 83 and 83' are mounted within a reflector frame 90, which telescopes within and is fastened to the outer end of the case 74 and is formed with the plurality of ribs 85 as previously described with reference to the frame 84. The reflectors are held in place and partially covered by shields 91, through which light openings of proper shapes are formed.

The light rays passing from the reflectors 82' and 83' travel along a channel 92, enclosed at opposite sides by plates 93 mounted within the case 74. This channel is in the center of the case 74 and provides a mounting space and guides for a measuring prism 94 and an adjusting prism 95. These prisms are shown in Fig. 9 as being of equal dimensions and in superimposed relation to each other. The prism 94 is in the direct path of travel of the light rays from reflector 82', and the prism 95 is in the path of travel of the light rays from the reflector 83'.

Reference being had to Fig. 6, it will be noted that the measuring prism 94 is mounted within a frame 96, threaded to fit and run upon the measuring screw 97, while the adjusting prism 95 is carried within a frame 98, threaded to fit and run upon an adjusting screw 99. The prisms 94 and 95 are in the shape of wedges, having flat vertical faces exposed to the rays of light passing along the channel 92, and inclined vertical faces tapering in both instances toward the right side of the instrument. By movement of these prisms it will be possible to refract the light rays to produce the measurements and adjustments desired. One end of the measuring screw 97 is carried in a bearing in the rib 77 formed upon the upper face of the case 74, and the other end in the bearing 89. The portions of the screw passing through these bearings are cylindrical and reduced in diameter. To the end of the screw shaft which extends through the bearing 89, an automatic take-up of the screw may be continuously effected by a plunger 100 pressing against a point at center of the end of the screw and forcing the circular knife edged shoulder of the screw 97 against the rib 77 and will act to hold this screw against longitudinal displacement. This plunger is mounted within a small cylinder 101 and is forced outwardly by means of an expansion spring 102. To the end of the screw 97 projecting beyond the rib 77 is fixed a pinion 103, which is in mesh with the range dial gear 104. The construction and operation of this dial will be hereinafter described.

In order that there shall be no lost motion between the frame 96 and the measuring screw 97 as it moves along the same, a take-up nut 96' is mounted upon the screw. This nut is constantly pressed toward the threaded portion of the frame by the action of expansion springs 105 as they operate between the nut 96' and the heads of bolts 106. This structure is particularly shown in Fig. 15. The frame 98, carrying the adjusting prism 95, is also fitted for the same purpose with an anti-lost motion nut 96', as previously described. The screw 99 is provided with a take-up plunger 100, mounted within a cylinder 101 and fitted with a spring 102 previously described. This will force the circular knife edged shoulder of the screw 99 against the bearing 89' and will act to properly hold this screw against longitudinal displacement. The forward end of the screw 99 is squared and may be engaged by a suitable key inserted through an opening in the head 107 of the case 53. This opening is normally closed by a plug 108.

A prism case 109 is formed in longitudinal alignment with the light channel 92 and as a continuation thereof. Mounted for horizontal movement in the forward end of this case is a sliding prism frame 110. This frame 110 carries a pair of equal halving and compensating prisms 111 and 112. The formation of these prisms is shown in Figs. 6 and 28, where they will be seen to be equally and oppositely tapered, to refract the rays toward each other, in a vertical plane. Combined with the tapers shown in the vertical section are tapers in the horizontal planes shown in Fig. 27, equal and opposite to those of 94 and 95, to bring the rays of light parallel to the direction they were traveling before incidence on 94 and 95 and to compensate or neutralize the dispersion of the same. Both of these faces are partially covered by small plates which have exposure openings thereto. The plates and prisms are fixed within the frame 110 and may be moved bodily by the operation of a shifting lever 113.

This lever is mounted midway its length by a pivot bracket 114 carried on the end of the tubular member 74. The outer end of this lever is provided with pins extending between collars upon an adjusting screw 115. This screw may be rotated by a key inserted through an opening in the end of the case and normally closed by the plug 116. The opposite end of the lever 113 is provided with a pin fitted in the slotted end of a push rod 117 as a part of the prism frame 110. The movement of the frame 110 is resisted by tension springs 118 fastened to lugs extending outwardly through the side walls of the prism case 109, and by their opposite ends to lugs carried by the case. It will be understood, of course, that the lever 113 extends through an opening in the side wall of the case 109. Beyond this opening is a diamond-shaped support 119, as shown in Fig. 6, mounted around the same are complementary sets of prisms, here termed erecting prisms. This set comprises prisms 120 and prisms 121 through which the light rays from the halving prisms pass and after three reflections brought to a focus in a vertical plane 122 to thereafter be focused upon by the eye-piece lenses 124 mounted in the tube 123. The erecting prisms are designed to reinvert the images, making them upright, and give an image field divided horizontally by a sharp "separating line," into upper and lower complementary halves. The reinversion of the images are brought about by reflections on the inner surfaces of the erecting prisms, and the sharp "separating line" between the upper and lower half image fields is brought about by inclining the faces of the erecting prisms, through which the light rays emerge, toward the eye-piece from the "separating line" so that all light rays emerging through the upper face are deviated upward, and those emerging through the lower face are deviated downward, relatively to their directions at incidence to those surfaces, thus eliminating all of those rays that strike the junction plane between the upper and lower erecting prism sets leaving only the sharp separating line visible. As shown in Fig. 7, the tube 123 may be rotated and moved axially within a cylindrical extension 125 formed as a part of the prism case 109. The axial travel is produced by rotating the eye-piece and the action of a pin 126 as it moves along a slot 127. This action will focus the eye-piece to accommodate the eye of the observer. This structure is shown by way of example as other forms of eye-pieces and other methods of focusing the same may be found more desirable in practice.

In the event that the instrument is to be used at night or under such conditions as make it impossible to find a desirable and distinctive objective point a pair of astigmatizer lenses 128 and 129 consisting of cylindrical lenses, may be moved into the paths of the light rays. These lenses do not affect the focus in horizontal planes, but modify it in the vertical planes so as to cause vertical elongations of the images. The astigmatizer lenses when in operation are interposed between the halving lenses and the erecting prisms. As particularly shown in Fig. 14, the lenses are carried by a frame member 130, which projects them through an opening in the side of the prism case 109. Member 130 is therefore adapted to move horizontally and is provided with a straight shank 131 slidably between two guideways 132, which are shown in Fig. 10 to be mounted upon the back of the housing 53. The shank has a longitudinal slot through it, one of which is formed with a gear rack 133. This rack is in constant mesh with a pinion 134 extending into the slot and adapted to be rotated by a thumb wheel 135.

As before intimated, the setting of measuring screw 97 and the measuring prism 94 constitute the means for determining the distance between the instrument and the observed object. This distance may be directly indicated by the mechanism through which the screw 97 is rotated. The details of construction of this mechanism are particularly shown in Figs. 6, 16, 18 and 26. In Fig. 6, it will be noted that the pinion 103 of the measuring screw 97 is in mesh with the range dial gear 104. This gear is fixed to a shaft 136 which is rotatably supported through a standard 137 carried upon the top of the main housing 53. Keyed upon the forward end of this shaft is a wheel 138 by which the gear 104 may be rotated. This wheel is secured in position by a nut 139 carried upon the threaded end of the shaft. Projecting from the forward face of 104 is an annular flange 140, which is clearly shown in Fig. 18 and is there indicated as being circumscribed by a clamping ring 141. This ring has an upward extending bracket 142 within which a clamp screw 143 that may be turned by the head 145 is mounted. The lower end of the clamp screw bears against a gib 144, which is carried within a cavity in the ring 141 and may be pressed against the flange 140 to create the necessary friction between the flange and the ring 141 and thus cause the gear 104 to rotate with the same. A housing 146 is secured to the main housing 53 and standard 137. As shown in Fig. 16, this housing is provided with a semi-circular opening 147, through which the upper half of the face of the range dial 104 is visible. Referring more particularly to Fig. 26, it will be noted that the face of the range dial 104 is formed with a spiral groove 148, along the length of which graduations are marked. These graduations may be in-scribed to indicate distance readings in terms of miles and yards. Due to the fact that a spiral groove is provided, it is possible to obtain a large range of graduations, as the gear may be rotated several times if required. The graduations upon the dial have a direct relation to a pointer 149, which is formed as a part of the sliding carriage 150 and may reciprocate vertically upon rods 151. This movement of the pointer carriage is effected by the engagement of a pin 152 with the groove 148. It will therefore be understood that as the range dial gear 104 rotates the pin will travel along the groove thus moving the pointer and its carriage vertically and causing the pointer to register with the successive graduations as they occur along the length of the spiral groove 148. These readings may be obtained when the range dial gear 104 is rotated by the handwheel 138. More accurate setting of the range dial and the measuring prism may be secured by tightening the clamping ring 141 upon the flange 140 and thereafter turning the tangent screw 153 carried in a bracket upon the housing 146 and indicated in Figs. 16 and 18. Lost motion at the tangent screw is taken up by a spring pressed plunger 154, fitting in the spring and plunger case mounted upon the housing 146.

To the yokes 59 are attached bearings 24 in which are fitted the hollow shafts 155, that form part of the counterweight levers 156, and to which are attached the counterweights 157. These hollow shafts have internal diameters large enough to clear the light passage tubes 55, and are held loosely in place by the nuts 155'. Each of the hollow shafts is fitted with a thumb screw 158, the end of which registers with a hole in the wall of the tube 55, and locks them together against relative rotation. The tubes 55 being joined to the case 53 by members 54, 56 and 57, also locking them against relative rotation, we see that the whole optical system is balanced about its horizontal axis and may be rotated about the same.

Assuming that various parts of the instrument are separated and that it is desired to assemble the same for operation, the pedestal 10 with its superstructure may be considered as having been placed in position and secured firmly at its base. The housing 53 carrying the central optical set may then be mounted in the seats 48 by swinging the stirrups of the same out of the way and placing the hub portions 52 in position, it being understood that these hubs are already fitted with the collars 54 holding the rings 50 and the roller bearings 51. The stirrups 49 may now be swung back into position and thereafter locked by the bolts 50'. The right and left tubes 11 and 12 may then be inserted through the openings in the ends of the cantilever beams and attached to the opposite ends of the housing 53 by slipping the tubes 55 over the ends of the collars 54 and causing the slots 58 to register with pins 57 as shown in Fig. 12. When this has been done, these members may be locked into position by the screws 56. The optical square units if not already connected to 55, may then be placed upon the ends of the tubes 55 and locked by means of the screws 68. It will thus be noted that provisions have been made to positively dispose the various elements of the structure in a pre-determined, assembled relation to each other, and that these elements may have slight expansion, contraction or distortion without objectionable results.

It will be further noted that when the instrument is thus assembled, the hollow shafts 155 of the counterweights 157 will be fastened to each of the tubes 55 by the screws 158 shown in Fig. 25. As shown in Fig. 2 these levers extend in the opposite direction from the portion "B" of the main housing 53 and upon the opposite sides of the longitudinal axis thereof, so that the instrument is held in equilibrium around this axis, and may be easily turned about the same, when observing an object above or below the horizontal plane passing through the base line of the instrument.

On making observations through the eye-piece of the instrument, OR light rays, as shown in Figs. 28 and 29, will pass through the lower halving prism 112 and will appear in the lower half of the image field. The OL light rays will pass through the upper halving prism 111 and will appear in the upper half of the image field. It will thus be evident that partial images of the object observed will appear in the upper and lower halves of the image field and may be in horizontal and vertical spaced relation to each other on opposite sides of the horizontal separating line of this field. The partial images in the upper and lower image field may be shifted toward or away from the separating line by the proper movement of the halving and compensating prisms 111 and 112 and they may also be shifted relatively to each other in their horizontal relationship by moving the adjusting prism 95 or the measuring prism 94.

To determine whether the instrument is in adjustment, the procedure likely to give the best results in the field is as follows:

First, focus the eye-piece on the separating line in the principal focal plane 122 by looking through the instrument at the clear sky, then test on some well defined and distant object.

Second, the adjustment of the halving prisms is made to cause the prisms 111 and 112 to be in such a position relative to the entire optical combination, that the partial images of the target will form a complete representation thereof. There must be neither "duplication", in which the same part of the target appears in both the upper and lower image fields, nor "deficiency", in which a part of the target does not appear in the upper and lower image fields. This adjustment can be tested on any object within the range of the instrument (distance need not be known). Objects of irregular form and small height are most suitable. Any needed adjustments to correct the halving errors can be made by turning the adjusting screw 115, with a key applied to the end thereof, thereby shifting the prisms 111 and 112 backward or forward, until the partial images of the target form a complete representation of the same.

Third, the adjustment of the instrument for "coincidence" or distance measuring may then be tested by focusing the instrument upon a heavenly body or any object at a known distance, the distance of the object being set off on the spiral scale of gear 104. If it is found that the images of the object in the upper and lower halves of the image field coincide as observed through the eye-piece, this portion of the instrument is in adjustment. Should the two images not coincide, they may be moved relatively to each other by turning the screw shaft 99 and thus manipulating the adjusting prism. This is done until coincidence is obtained. This last adjustment should be made very carefully.

In determining the distance to an object, the instrument depends upon its ability to measure and indicate accurately in terms of distance the magnitude of the angle subtended by its base at the point whose distance is to be determined. It will be understood that the base of the instrument is the distance between the optical centers of the optical squares 67. The method of measuring the subtended angle is shown schematically in Fig. 29, in which the transverse center line has been shown as two lines separated for convenience in describing the operation. Let it be assumed that OR and OL are two rays of light coming from a point at infinity and striking the two optical squares of the instrument. These rays are then reflected through 90 degrees by the reflectors 69 and 70, as shown in Fig. 4, after which they pass toward the center of the instrument and strike the reflectors 80 and 81, when they are reflected horizontally through approximately 90 degrees. In addition to the horizontal changes in the direction of the light rays at these reflectors, OR has been inclined downwardly and OL inclined upwardly. After these rays have passed through the objective lenses 88, they strike the reflectors 82 and 83; they are then reflected horizontally through approximately 180 degrees, and the rays are again inclined so that they leave the reflectors 82' and 83' parallel to each other, but separated far enough vertically to prevent the beams of light from overlapping each other. After leaving the reflectors 82' and 83', the light rays pass through the measuring and adjusting prisms 94 and 95, then through the combined halving and compensating prisms 111 and 112, thereafter passing through the erecting prisms 120 and 121 and forming images at 122 (as shown in Fig. 29). These images may then be viewed through the eye-piece 124.

Since the rays of light OR, whether from a point at infinity or nearby, pass along the same route during all observations after adjustment, we see that only OL and OL' concern us in describing the method used in measuring the parallatic angle. For simplicity we can partially rectify the paths of the light rays OL and OL' from their passage through the objective lens to the focal plane of the eye-piece. This partial rectification is shown in the Fig. 30. With reference to this view, let D equal the horizontal displacement of the image from the center line of the instrument. Let B equal the angles of minimum deviation of the prisms 94 and 95, and the bisector of the prism 94 is so inclined to the light rays that the angle of minimum deviation occurs when the measuring prism is midway the length of its path of travel. Let A equal the parallactic angle, i. e., the angle subtended by the base at the point whose distance is sought. This angle does not generally exceed 30 minutes of arc. Let F equal the focal length of the objective lens. Let T equal the distance that the measuring prism has traveled from its position, for "A" equals 0 degrees, 0 minutes, 0 seconds, or parallelism between OR and OL. Let M equal the distance from the measuring prism 94, at its position for A equals 0°—0'—0" to the halving and compensating prism 111. Let N equal the distance from the halving and compensating prism 111 to the focal plane at 122. All distances are to be measured along the path traversed by the light ray. Then assuming that the sines vary directly as their angles and that the co-sines equal one, we have:

$$-M \sin B = D$$
$$-M \sin B = L \sin A + (T+M) \sin (A-B) + N \sin A$$
$$-M \sin B = L \sin A + (T+M) \sin A - (T+M) \sin B + N \sin A$$
$$(L+T+M+N) \sin A - T \sin B = 0$$
$$F \sin A = T \sin B \therefore \sin A = T \frac{\sin B}{F}$$

In the last equation, the quantity, sin B over F is a constant showing that the travel of the measuring prisms can be used as a direct measure of the parallactic angle A. It will also be noted that M is eliminated from the equation showing that the point at which the measuring prism 94 is placed when setting the reading for distance on the range dial, before adjusting is of no importance, as it makes no difference in the accurate measuring and distance indicating of the instrument.

Thus far the astigmatizer lenses 128 and 129 have been considered as moved out of the path of the rays of light, but should it be desirable to make observations at night on a point of light, the astigmatizer lenses are brought into the position, shown in Fig. 14 of the drawings, by turning the knob 135. This will cause the rays from the light to pass through the astigmatizer lenses and appear to be elongated into vertical lines in the upper and lower image fields. Then by turning the screw 97, the measuring prism 94 may be moved until coincidence or continuity of the two images is established, after which the distance to the observed light point may be read off on the spiral scale of the range dial. The astigmatizer lenses may also be used when observing the distance to objects lacking in sharpness of outline or which are deficient in upright markings. In this case the lenses will perform the function of elongating the images in the upper and lower image fields so that some prominent and easily recognizable feature may be brought into coincidence or matched.

In the present structure it will be noted that the edge of the measuring prism is so placed as to require it to move outwardly along its screw, as the shorter distances are measured. This arrangement insures a high degree of accuracy when determining the distances at the longer ranges, as then there will be the shortest length of measuring screw between the fixed shoulder and the measuring prism frame, subject to expansion and contraction from temperature changes. Under certain conditions, it no doubt would be preferable to turn the measuring prism through 180 degrees, making it necessary to place it at the other end of the measuring screw from that as shown, for the infinity reading, and moving it inwardly, toward the erecting prisms, when measuring the shorter distances. The adjusting prisms 95 may also be reversed from the position shown without affecting the results, and it will be understood that any arrangement of the prisms upon the measuring screw 97 and adjusting screw 99, and of the halving and compensating prisms to correspond therewith, may be made if desired, without departing from the spirit of the invention.

It will also be understood that, in combination with the various arrangements of the measuring, adjusting and halving and compensating prisms, noted above, the objective lenses may be interposed between the optical squares and the reflectors 80 and 81, also without departing from the spirit of the invention.

Furthermore, symmetry is not essential in the construction of this instrument, and the optical squares may be placed at different distances from the center of the same, while retaining their positions at the opposite sides of the center line. While this is not the best arrangement, still it is possible to get good results, and the inclusion of this arrangement does not depart from the spirit of the invention.

It will thus be seen that the instrument herein described is desirably constructed in several compact units which may be easily dismounted or assembled, and which may be moved from place to place without losing their individual adjustment, and thus insuring that they may be easily assembled and the whole instrument used without further readjustment.

While I have shown the preferred form of my invention as now known to me, it will be understood that various changes in the combination, construction and arrangement of parts may be made by those skilled in the art, without departing from the spirit of the invention as claimed.

Having thus described my invention, what I claim and desire to secure by Letters Patent is—

1. In a range finder, a pair of optical squares spaced apart from each other a distance representing the base line of the instrument, an eye-piece located between the same, said optical squares receiving light rays from an observed object and reflecting the same at right angles to their original directions and toward each other along the base line, two oppositely tilted 90° reflectors arranged to change the course of the light rays received from the optical squares to separate paths lying in vertical and substantially parallel planes and extending away from the observer and inclined in opposite directions from the horizontal, objective lenses adjacent to the 90° reflectors and through which said light rays pass, double reflecting surfaces located in the path of the light rays from the 90° reflectors for changing the directions of the separate sets of light rays through 180° and causing the same to travel in separate superimposed paths toward the observer, an adjusting prism in the path of travel of one of the sets of light rays from the double reflecting surfaces, a measuring prism in the path of travel of the other set of light rays from the double reflecting surfaces, halving and erecting prisms in front of the eye-piece and through which the two sets of light rays separately pass to form two complementary image fields in the focal plane of the eye-piece.

2. In a range finder, a pair of optical squares spaced apart from each other a distance representing the base line of the instrument, an eye-piece located between the same, said optical squares receiving light rays from an observed object and reflecting the same at right angles to their original directions and toward each other along the base line, two oppositely tilted 90° reflectors, one of which is disposed at each side of the horizontal transverse center line of the instrument to change the course of the oppositely traveling light rays to separate paths lying in vertical planes substantially parallel to the said center line and at the same time incline them in opposite directions from the horizontal, objective lenses fixed with relation to themselves and adjacent to the 90° reflectors, double reflecting surfaces located in the paths of the light rays from the 90° reflectors for changing the direction of travel of the two sets of light rays through 180° and causing them to travel along superimposed paths between the aforesaid paths and lying in horizontal planes substantially parallel to said transverse center line, an adjusting prism in the path of travel of one of the sets of light rays from the double reflecting surfaces, a measuring prism in the path of travel of the other set of light rays from the double reflecting surfaces, halving and erecting prisms in front of the eye-piece and through which the two sets of light rays separately pass to form two complementary image fields in the focal plane of the eye-piece.

3. In a range finder, a pair of optical squares spaced apart from each other a distance representing the base line of the instrument, said optical squares receiving light rays from an observed object and reflecting the same toward each other along the base line and at right angles to their original directions, two oppositely tilted 90° reflectors, one of which is disposed at each side of the horizontal transverse center line of the instrument to change the course of the oppositely traveling light rays to separate paths lying in planes substantially parallel to said transverse center line and at the same time incline them in opposite direction from the horizontal plane, objective lenses fixed with relation to themselves and adjacent to the 90° reflectors, double reflecting surfaces located in the paths of light rays from the 90° reflectors for changing the directions of travel of the two sets of light rays through 180° and causing them to travel along superimposed paths, an adjusting prism in the path of travel of the lower light rays from the double reflecting surfaces, a measuring prism in the path of travel of the upper light rays from the double reflecting surfaces, erecting and separating prisms in the continuation of the light rays from the double reflecting surfaces and through which they pass as separated rays and by which they are caused to appear in upper and lower superimposed complementary image fields, an eye-piece located centrally of the base line for observing said image fields, and combined halving and compensating prisms interposed between the measuring and adjusting prisms and the erecting prisms for the passage of the light rays on their ways to said eye-piece.

4. In a range finder, an eye-piece, optical squares for receiving light rays from an observed object, the said optical squares being in the same horizontal plane with the eye-piece and disposed at opposite ends of a base line at right angles to the axis of the eye-piece, reflecting means near the center of the base line for changing the direction of the light rays emerging from the two optical squares through 90°, at the same time directing them away from the observer in substantially vertical planes, other reflecting means beyond the 90° reflector and in the paths of the lights rays from the same whereby the light rays are reflected through 180° and transposed to separate paths with their directions of travel towards the eye-piece, separating prisms for producing a two part focal plane in front of the eye-piece, and prisms between the 180° reflecting means and the separating prisms adapted to produce coincidence of the partial images of the observed object in the two parts of said plane.

5. A range finder embodying the imaginary base line an eye-piece at right angles thereto and midway the length thereof, a pair of optical squares positioned at the opposite ends of said base line and determining the length of the same, 90° reflectors disposed adjacent to the ocular axis, and on opposite sides thereof to receive the emergent light rays from the optical squares, a pair of objective lenses fixed with relation to themselves and to the 90° reflectors, one of which lenses is disposed in the path of light rays passing from each 90° reflector and bending the two sets of rays in opposite directions, 180° reflectors for receiving the rays passing through the objective lenses and causing them to travel along superimposed paths within the paths of travel of the rays passing from said 90° reflectors and through said lenses and substantially in the same vertical plane with the ocular axis of the instrument, an adjusting prism disposed in the path of travel of the lower set of light rays, a measuring prism disposed in the path of travel of the upper set of light rays, compensating and halving prisms through which the light rays pass from the measuring and adjusting prisms, an eye-piece and set of erecting prisms interposed between the compensating prisms and the eye-piece, all of the separate light rays being spaced apart throughout their entire course of travel.

6. In a range finder, an eye-piece, optical squares for receiving light rays from an observed object, the said optical squares being in the same horizontal plane therewith and disposed at opposite ends of a base line at ringht angles to the axis of the eye-piece, reflecting means near the center of the base line for changing the direction of the emergent light rays from the two optical squares through 90°, at the same time directing them away from the observer in substantially vertical planes, other reflecting means beyond the 90° reflectors and in the paths of the light rays from the same whereby the light rays are reflected through 180° and transposed to travel in separate paths with their direction of travel toward the eye-piece, separating prisms for producing a two part focal plane in front of the eye-piece, an adjustable prism between the 180° reflecting means and the separating prisms adapted to produce coinsidence of the partial images of the observed object in the two parts of the said plane, a spiral scale, an indicator movable along the scale, mechanical means connecting the adjustable prism with the spiral scale whereby the positions of the adjustable prism will be recorded in terms of range.

7. In a range finder of the self-contained base, single observer, coincidence type, the combination of a center casing, two light passage tubes connected to the center casing, two optical squares, one being mounted at each outer extremity of the light passage tubes that receive light rays from an observed object and reflect the same toward each other and at right angles to their original directions, an ocular system including erecting prisms and a lens portion and mounted centrally of the base line and at right angles to the same, two 90° reflectors, one at each side of the ocular system and adjacent thereto, and tilted to reflect the light rays received from the optical squares through 90° away from the observer when projected on a horizontal plane and incline the same in opposite directions, above and below the said horizontal plane, two objective lenses, one adjacent to each 90° reflector for the passage of the light rays, double reflecting surfaces located in the paths of the light rays from the 90° reflectors for changing the directions of the separate sets of light rays through 180° and causing them to travel toward the ocular system in superimposed horizontal paths lying approximately in the vertical transverse center plane, measuring and adjusting prisms, halving and compensating prisms between the double reflecting surfaces and the ocular system, through which prisms and the erecting prisms of the ocular system the separate light rays pass to form independent complementary image fields to be viewed through the lens portion of the ocular system.

8. In a range finder of the self-contained base, single observer, coincidence type, the combination of a center casing, two light passage tubes connected to the center casing, two optical squares, one being mounted at each outer extremity of the light passage tubes that receive light rays from an observed object and reflect the same toward each other and at right angles to their original directions, an ocular system including erecting prisms and a lens portion and mounted centrally of the base line and at right angles to the same, two 90° reflectors, one at each side of the ocular system and adjacent thereto, and tilted to reflect the light rays received from the optical squares through 90° away from the observer when projected on a horizontal plane and incline the same in opposite directions, above and below the said horizontal plane, two objective lenses, one adjacent to each 90° reflector for the passage of the light rays, two double reflecting surfaces located in the paths of the light rays from the 90° reflectors for changing the directions of the separate sets of light rays through 180° and causing them to travel toward the ocular system in superimposed horizontal paths lying approximately in the vertical transverse center plane, measuring and adjusting prism, halving and compensating prisms between the double reflecting surfaces and the ocular system, through which prisms and the erecting prisms of the ocular system the separate light rays pass to form independent complementary image fields to be viewed through the lens portion of the ocular system, a shaft having a threaded connection with the measuring prism, a pinion fixed to the said shaft, and distance indicating means having a combined dial and spur gear meshing directly with the pinion of the said shaft.

9. In a range finder of the self-contained base, single observer, coincidence type, the combination of a center casing, two light passage tubes connected to the center casing, two optical squares, one being mounted at each outer extremity of the light passage tubes that receive light rays from an observed object and reflect the same toward each other and at right angles to their original directions, an ocular system including erecting prisms and a lens portion and mounted centrally of the base line and at right angles to the same, two 90° reflectors, one at each side of the ocular system and adjacent thereto, and tilted to reflect the light rays received from the optical squares, through 90° away from the observer when projected on a horizontal plane and incline the same in opposite directions, above and below the said plane of projection, two objective lenses, one adjacent to each 90° reflector for the passage of the light rays, two double reflecting surfaces located in the paths of the light rays from the 90° reflectors for changing the directions of the separate sets of light rays through 180° and causing them to travel toward the ocular system in superimposed horizontal paths lying approximately in the vertical transverse center plane, measuring and adjusting prisms halving and compensating prisms between the double reflecting surfaces and the ocular system, through which prisms and the erecting prisms of the ocular system the separate light rays pass to form independent complementary image fields to be viewed through the lens portion of the ocular system, a shaft having a threaded connection with the measuring prism, a pinion fixed to the said shaft, distance indicating means having a combined dial and spur gear meshing directly with the pinion of the said shaft, the halving and compensating prisms being mounted to move back and forth to rectify errors of vertical displacements of the complementary image fields, and the erecting prisms of the ocular system serving to bring the image fields to true relative positions before the lens ocular.

10. In a range finder of the self-contained base, single observer, coincidence type, the combination of a center casing, an interior casing, two light passage tubes connected to the center casing, two optical squares, one being mounted at each outer extremity of the light passage tubes that receive light rays from an observed object and reflect the same toward each other and at right angles to their original directions, an ocular system including erecting prisms and a lens portion and mounted centrally of the base line and at right angles to the same, two 90° reflectors, one at each side of the ocular system and adjacent thereto, and tilted to reflect the light rays received from the optical squares through 90° away from the observer when projected on a horizontal plane and incline the same in opposite directions, above and below the said plane of projection, two objective lenses, one adjacent to each 90° reflector for the passage of the light rays, two double reflecting surfaces located in the paths of the light rays from the 90° reflectors, for changing the directions of the separate sets of light rays through 180° and causing them to travel toward the ocular system in superimposed horizontal paths lying approximately in the vertical transverse center plane, measuring and adjusting prisms, and halving and compensating prisms between the double reflecting surfaces and the ocular system, through which prisms and the erecting prisms of the ocular system the separate light rays pass to form independent complementary image fields to be viewed through the lens portion of the ocular system, a shaft having a threaded connection with the measuring prism, a pinion fixed to the said shaft, distance indicating means having a combined dial and spur gear meshing directly with the pinion of the said shaft, halving and compensating prisms mounted to move back and forth to rectify errors of vertical displacement of the complementary image fields, the erecting prisms of the ocular system serving to bring the image fields to true relative position before the lens portion of the ocular system, the interior casing being mounted within the center casing, and containing all of the said optical parts, except the optical squares, so as to be free from local thermal effects and flexure strains in the main casings of the base line.

11. In a range finder of the self-contained base, single observer, coincidence type, the combination of a center casing, an interior casing, two light passage tubes connected to the center casing, two optical squares, one being mounted at each outer extremity of the light passage tubes that receive light rays from an observed object and reflect the same toward each other and at right angles to their original directions, an ocular system including erecting prisms and a lens portion and mounted centrally of the base line and at right angles to the same, two 90° reflectors, one at each side of the ocular system and adjacent thereto, and tilted to reflect the light rays received from the optical squares through 90° away from the observer when projected on a horizontal plane and incline the same in opposite directions, above and below the said plane of projection, two objective lenses, one adjacent to each 90° reflector for the passage of the light rays, two double reflecting surfaces located in the paths of the light rays from the 90° reflectors for changing the directions of the separate sets of light rays through 180° and causing them to travel toward the ocular system in superimposed horizontal paths lying approximately in the vertical transverse center plane, measuring and adjusting prisms, halving and compensating prisms between the double reflecting surfaces and the ocular system, through which prisms and the erecting prisms of the ocular system the separate light rays pass to form independent complementary image fields to be viewed through the lens portion of the ocular system, the interior casing being mounted within the center casing, and containing all of the said optical parts, except the optical squares so that they may be free from local thermal effects and flexure strains in the center casing of the base line.

12. In a range finder of the self-contained base, single observer, coincidence type, the combination of a center casing, two light passage tubes connected to the center casing, two optical squares, one being mounted at each outer extremity of the light passage tubes that receive light rays from an observed object and reflect the same toward each other and at right angles to their original directions, an ocular system mounted centrally of the base line and at right angles to the same, two 90° reflectors, one at each side of the ocular system and adjacent thereto, and tilted to reflect the light rays received from the optical squares through 90° away from the observer when projected on a horizontal plane and incline the same in opposite directions, above and below the said plane of projection, two objective lenses, one adjacent to each 90° reflector for the passage of the light rays, two double reflecting surfaces located in the paths of the light rays from the 90° reflectors for changing the directions of the separate sets of light rays through 180° and causing them to travel toward the ocular system in superimposed horizontal paths lying approximately in the vertical transverse center plane, measuring and adjusting prisms, halving and compensating prisms between the double reflecting surfaces and the ocular system, through which prisms and the erecting prisms of the ocular system the separate light rays pass to form independent complementary image fields to be viewed through the lens portion of the ocular system, a pedestal, an azimuth controlled superstructure mounted on the pedestal, horizontal bearings fastened to the framed superstructure to carry the central casing, to which are fastened the inner ends of the light passage tubes, other bearings forming part of the framed superstructure for supporting the outer ends of the light passage tubes, so that the central casing and light passage tubes may be rotated as a unit about their common horizontal axis.

13. In a range finder of the self-contained base, single observer, coincidence type, the combination of two optical squares receiving light rays from an observed object and reflecting the same toward the center of the instrument and at right angles to their original directions, an ocular system, including erecting prisms and a lens portion, and mounted centrally of the base line of the instrument and at right angles to the same, two 90° reflectors, one at each side of the ocular system and adjacent thereto and tilted to reflect the light rays away from the observer, two objective lenses, one adjacent to each 90° reflector for the passage of the light rays, two double reflecting surfaces located in the paths of the light rays from the 90° reflectors for changing the directions of the separate sets of light rays through 180° causing them to travel toward the ocular system in superimposed paths lying approximately in the vertical transverse center plane, measuring and adjusting prisms and halving and compensating prisms between double reflecting surfaces and the ocular system, through which prisms and the erecting prisms of the ocular system the separate light rays pass to form independent complementary image fields to be viewed through the lens portion of the ocular system.

14. A range finder embodying a base line, an ocular system with its axis at right angles thereto and substantially midway the length thereof, a pair of optical squares to receive light rays from the observed object, and positioned at the opposite ends of said base line and determining the length of the same, 90° reflectors disposed adjacent to the ocular system, and on opposite sides thereof to receive the light rays emerging from the optical squares, a pair of objective lenses, one of which is disposed adjacent to each 90° reflector for the passage of the light rays, double reflecting surfaces located beyond the base line and in the path of the light rays from the 90° reflectors and the objective lenses for changing the directions of the separate sets of light rays through 180°, causing them to travel along superimposed spaced paths and substantially in the same vertical plane with the ocular axis of the instrument, an adjusting prism disposed in the path of travel of one of the sets of light rays from the 180° reflecting surfaces, a measuring prism disposed in the path of travel of the other set of light rays from the 180° reflecting surfaces, compensating and halving prisms in front of the ocular system through which the light rays pass from the measuring and adjusting prisms to the erecting prisms and eye-piece of the ocular system, the separate light rays traveling over paths spaced from one another until they reach the focal plane of the eye-piece, and a mechanism for moving the measuring prism, by which the magnitude of an angle subtended by the base is determined, and mechanical means for indicating this angle in terms of linear units of range.

15. In a range finder, a pair of optical squares spaced apart from each other a distance representing the base line of the instrument, said optical squares receiving light rays from an observed object and reflecting the same rays at right angles to their original directions and toward each other along the base line, an ocular system including erecting prisms and an eye-piece and located between said optical squares, two 90° reflectors situated in front of the ocular system and adjacent to the sides thereof, adapted to direct the incident light rays at right angles to their course of travel from the optical squares and away from the observer, an objective lens adjacent to each 90° reflector through which the separate light rays pass, double reflecting surfaces in the paths of the light rays from the 90° reflectors adapted to reverse the directions of travel of the light rays, and translate them to horizontal superimposed paths directed to the eye-piece, measuring and adjusting prisms, halving and compensating prisms in front of the ocular system and in the paths of travel from the double reflecting surfaces through which and the erecting prisms of the ocular system they pass to form an image field divided horizontally by a sharp separating line into upper and lower complementary halves where it is viewed through the eye-piece of the ocular system.

16. In a coincidence range finder, optical squares defining the base line of the instrument, an ocular system including erecting prisms and an eye-piece and located midway of the said base line, two 90° reflectors situated in front of the ocular system and adjacent to the sides thereof for reflecting the light rays received from the optical squares through 90°, two double reflecting surfaces in the paths of the light rays from the 90° reflectors adapted to reverse the directions of travel of the light rays and translate them to substantially horizontal superimposed paths directed to the eye-piece, measuring and adjusting prisms, halving and compensating prisms in front of the ocular system, and in the paths of travel of the light rays from the double reflecting surfaces through which and the erecting prisms of the ocular system the separated light rays travel to the eye-piece, forming independent complementary image fields of the light rays from an observed object.

17. A range finder, including a pair of optical squares for receiving light rays from an observed object and reflecting the same at right angles to their original directions and toward each other, two oppositely tilted 90° reflectors substantially midway between the optical squares and arranged to change the course of the light rays received from the optical squares to separate paths extending away from the observer and inclined in opposite directions from the horizonal, two double reflecting surfaces located beyond the 90° reflectors and in the paths of the light rays from the same for reversing the direction of the separate sets of light rays, causing the same to travel in separate paths toward the observer, objective lenses located adjacent the 90° reflectors, an ocular system arranged to receive the said light rays and having means for forming two complementary image fields, and provided with an eye-piece for observing the same.

18. In a range finder of the self-contained base, single observer, coincidence type, the combination of a base, an optical square at each end of the base and determining its length, an ocular system substantially midway the length of the base and comprising separating and erecting prisms and an eye-piece, an objective lens and reflector adjacent to each other and adjacent to each side of and in front of the ocular system and arranged to direct the light rays in separate paths away from the observer, double reflecting surfaces located in front of the ocular system, measuring and adjusting prisms and halving and compensating prisms between the double reflecting surfaces and the ocular system whereby complementary image fields are formed in the focal plane of the eye-piece lying in front of the same by rays of light from an observed object entering the instrument at the optical squares, there to be reflected through 90° from their original directions and toward the center of the instrument, where they strike against the reflectors and pass through the objectives adjacent to the ocular system and are caused to travel away from the observer and toward the double reflecting surfaces, which translate the incident rays and reverse their directions so that they travel toward the ocular system in separate paths on their way there to passing through the measuring and adjusting prisms, halving and compensating prisms, and enter the separating and erecting prisms of the ocular system and emerge from the same above and below a horizontal line to form the complementary image fields.

19. In a range finder, a supporting structure comprising a pedestal, a central frame member pivoted to rotate horizontally thereon, tubular cantilever beams carried by said frame member and extending oppositely therefrom, an optical unit housing mounted upon the frame member and free to rotate around the central longitudinal axis of said beams, and tubes for the passage of light rays extending through said beams and detachably fastened to the opposite sides of said housing.

20. In a range finder, a fixed pedestal, a main frame rotatably mounted upon said pedestal, a pair of tubular cantilever beams in longitudinal alignment, extending outwardly from the opposite sides of the main frame and fixed thereto, an optical housing mounted for rotation within the main frame and around the longitudinal axis thereof, tubular arms, one of which extends through each of the beams and is detachably fixed to the housing, optical squares carried upon the opposite outer ends of said tubular arms, means within the housing for reflecting the emanating rays from said optical squares in superimposed planes.

21. In a range finder, a base, a housing mounted on the base and provided with a lateral extension having a central channel, light tubes connected to opposite sides of the housing, and communicating with the latter, optical squares carried by the ends of said tubes, 90° reflectors positioned in the housing and spaced from each other and deflecting the rays from the optical squares laterally in spaced relation toward the end of the lateral extension of the housing, objective lenses fixed in the said lateral extension adjacent to the said 90° reflectors, the latter being arranged to direct one ray upwardly and the other ray downwardly, reflectors disposed at the rear of said lateral extension of the housing to cause said two laterally traveling light rays to travel along spaced superimposed paths through the aforesaid channel and pass through the space between the 90° reflectors, and an eye-piece through which the rays may be viewed.

22. In a range finder, a base, a housing mounted on the base and provided with a lateral extension having a central channel, light tubes connected to opposite sides of the housing, and communicating with the latter, optical squares carried by the ends of said tubes, 90° reflectors positioned in the housing and spaced from each other and deflecting the rays from the optical squares laterally in spaced relation toward the end of the lateral extension of the housing, objective lenses fixed in the said lateral extension adjacent to the said 90° reflectors, the latter being arranged to direct one ray upwardly and the other ray downwardly, reflectors disposed at the rear of said lateral extension of the housing to cause said two laterally traveling light rays to travel along spaced superimposed paths through the aforesaid channel and pass through the space between the 90° reflectors, and an adjusting prism in the path of travel of the lower light ray which passes through said channel, and a measuring prism in the path of travel of the upper light ray passing through said channel.

23. In a range finder, a base, a housing mounted on the base and provided with a lateral extension having a central channel, light tubes connected to opposite sides of the housing, and communicating with the latter, optical squares carried by the ends of said tubes, 90° reflectors positioned in the housing and spaced from each other and deflecting the rays from the optical squares laterally in spaced relation toward the end of the lateral extension of the housing, objective lenses fixed in the said lateral extension adjacent to the said 90° reflectors, the latter being arranged to direct one ray upwardly and the other ray downwardly, reflectors disposed at the rear of said lateral extension of the housing to cause said two laterally traveling light rays to travel along spaced superimposed paths through the aforesaid channel and pass through the space between the 90° reflectors, an adjusting prism in the path of travel of the lower light ray which passes through said channel, a measuring prism in the path of travel of the upper light ray passing through said channel, erecting prisms through which the separate light rays separately pass and by which they are caused to appear in the upper and lower portions of a focal plane for observance through the eye-piece of the instrument.

24. In a range finder, a pair of optical squares spaced apart from each other a distance representing the base line of the instrument, the optical squares receiving incident rays, reflecting reflected rays at right angles to the incident rays and toward each other along the base line, reflectors, one of which is disposed at each side of the transverse center of the instrument and which prevent meeting of the oppositely traveling rays and deflect same laterally, one ray upwardly and the other ray downwardly, and reflectors for causing said upwardly and downwardly traveling rays to travel toward the first mentioned reflectors in spaced superimposed paths and pass between said first mentioned reflectors, erecting prisms through which the two sets of light rays separately pass and by which they are caused to appear in the upper and lower portions of a focal plane, and an eye-piece for observing said plane.

In testimony whereof I have hereunto set my hand in the presence of two subscribing witnesses.

FELIX H. CARSSOW.

Witnesses:
E. F. WILSON,
A. F. COLEMAN.